May 16, 1933.　　　　　J. BETHENOD　　　　　1,908,880
ALTERNATING CURRENT ELECTRIC MOTOR FOR PHONOGRAPHS AND THE LIKE
Filed Dec. 4, 1929　　　3 Sheets-Sheet 1
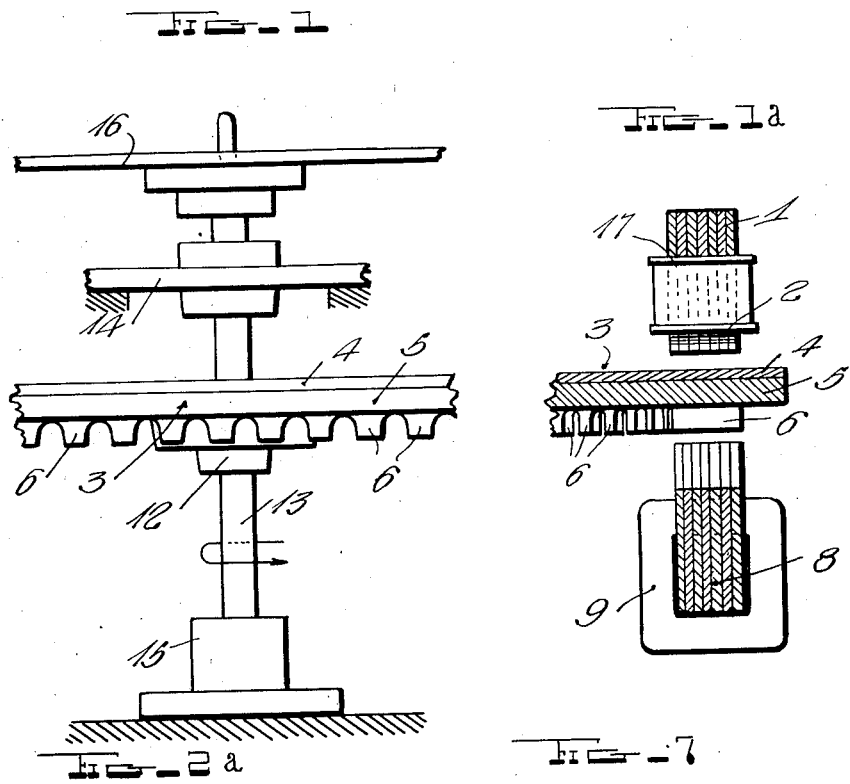
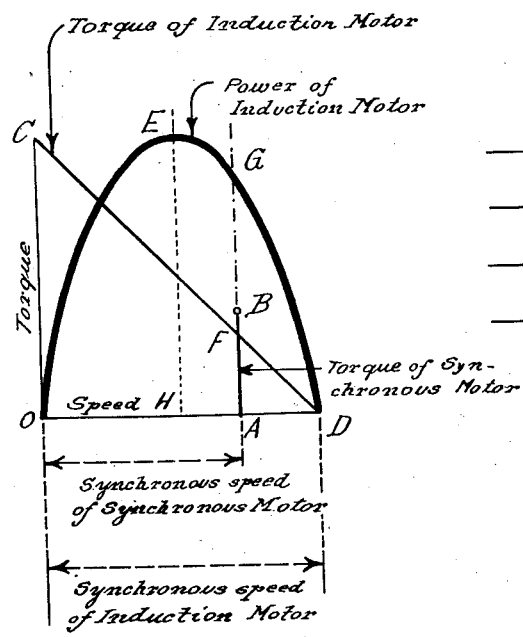
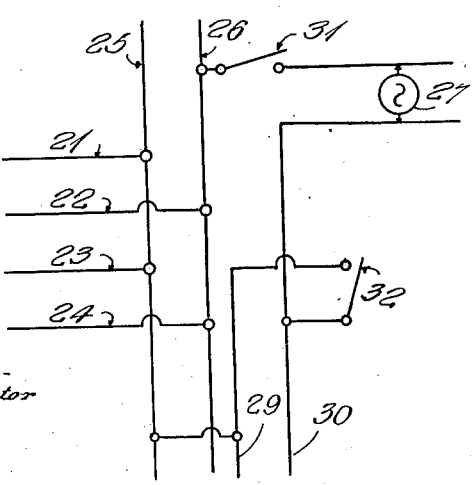
INVENTOR.
Joseph Bethenod,
BY
John C. Brody
ATTORNEY.

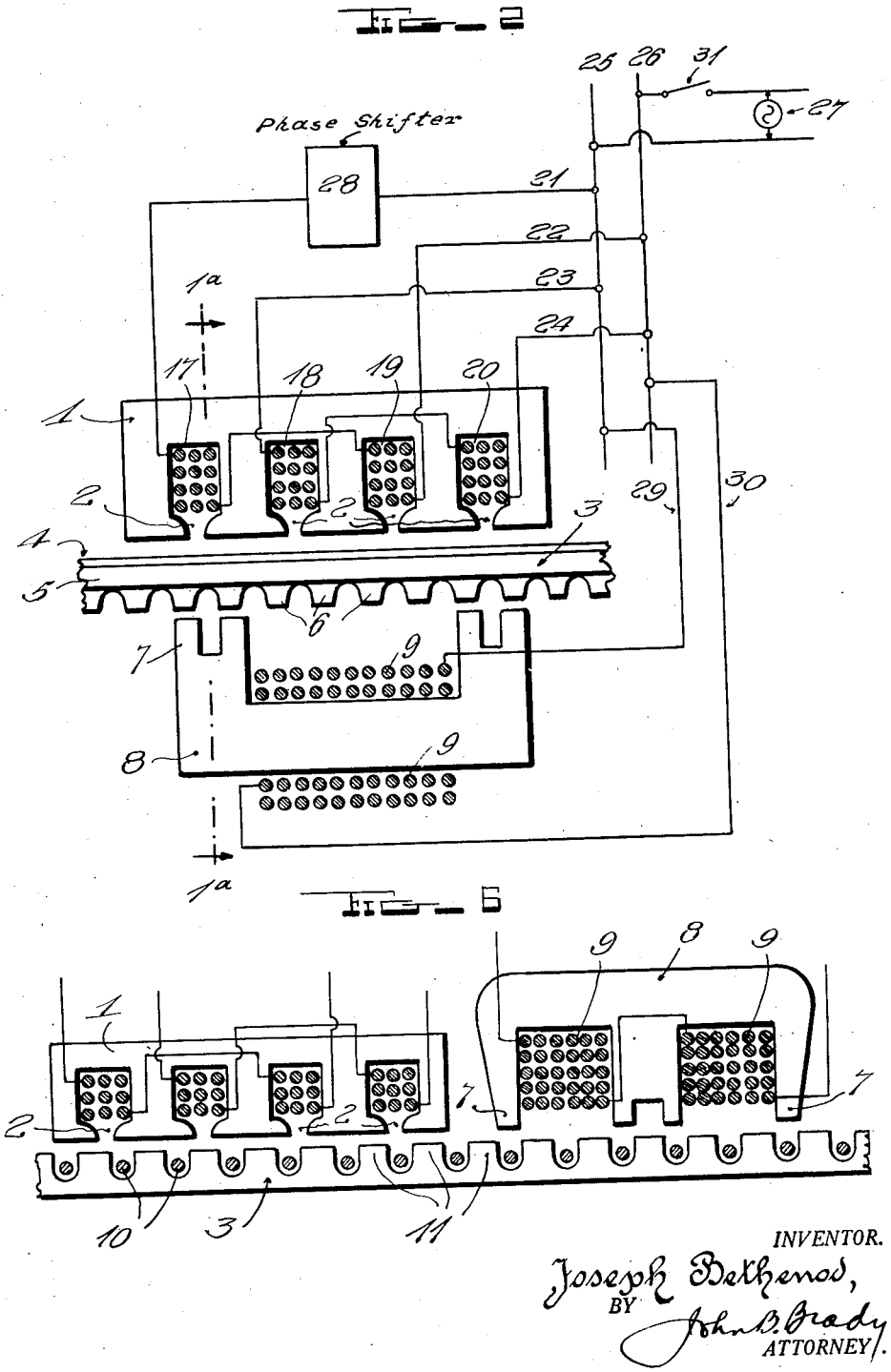

May 16, 1933.    J. BETHENOD    1,908,880
ALTERNATING CURRENT ELECTRIC MOTOR FOR PHONOGRAPHS AND THE LIKE
Filed Dec. 4, 1929    3 Sheets-Sheet 3

Inventor:
Joseph Bethenod
By John O. Brady
Attorney

Patented May 16, 1933                                      1,908,880

UNITED STATES PATENT OFFICE

JOSEPH BETHENOD, OF PARIS, FRANCE

ALTERNATING CURRENT ELECTRIC MOTOR FOR PHONOGRAPHS AND THE LIKE

Application filed December 4, 1929, Serial No. 411,591, and in France December 6, 1928.

The present invention has for its object to provide an alternating current electric motor suitable for driving phonographs or similar purposes. The motor drives directly the table carrying the record disc (or equivalent member) without the necessity of providing it with a friction governor of the usual type, it comprises no commutator and its construction is sturdy and economical.

Figure 3:
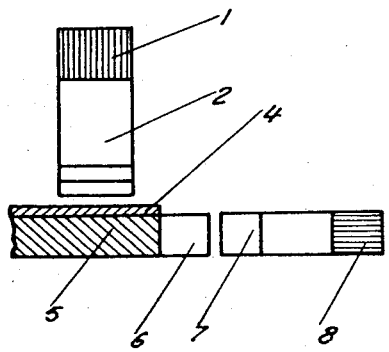
Figure 5:
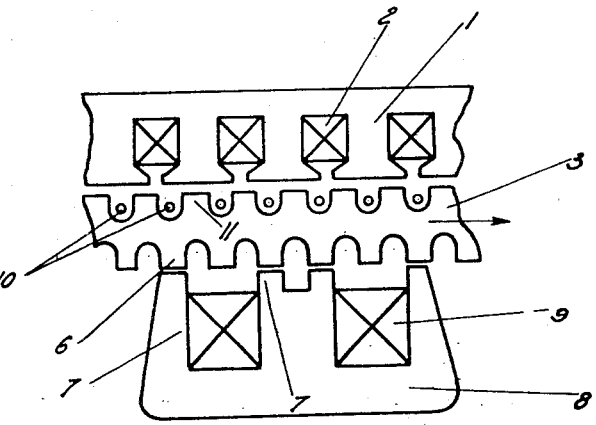
Figure 4:
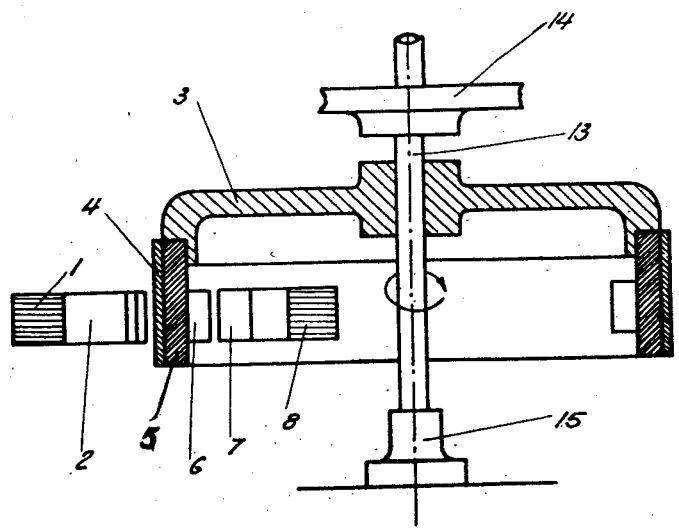

Figures 1 and 2 show one embodiment of the invention; Fig. 1a shows a sectional view of the stators on the line 1a—1a of Fig. 2; Fig. 2a shows the characteristic curve of the power of the device as a function of speed; Fig. 3 shows a modified form wherein the stator laminations are perpendicular to the rotor axis; Fig. 4 shows a modified form wherein the rotor is cylindrical and the stator is adjacent the cylindrical surface of the rotor; Fig. 5 shows a modified form wherein the induction motor side of the rotor is slotted and wound; Fig. 6 shows a modification wherein the rotor is slotted and wound and both stators are on the same side of the rotor; and Fig. 7 shows a method of connecting the windings of the two stators in series.

In the arrangement shown in Figs. 1 and 2 the rotor member of the motor is shown at 3 (Fig. 1) and is given the form of a wheel, the hub 12 of which is secured on a vertical shaft 13 which is held in bearings 14 and 15 and carries at its upper end the turn table 16 on which the record disc is placed. The rotor comprises a disc 4 of a metal, such as copper or aluminum, which is a good conductor and a plate 5 of magnetic material. The disc 4 is subjected to the inductive effect of a stator 1, formed of laminated metal and provided with slots 2; this stator is arranged close to the periphery of the rotor, as may be seen from Fig. 1a, which shows a section taken on the line 1a—1a of Fig. 2. In order to explain the arrangement there have been shown in Fig. 2, four slots of which two, 17 and 19, carry the active conductors belonging to a first coil, and a second coil corresponds to slots 18 and 20. The first coil is supplied through the conductors 21 and 22, the second through conductors 23 and 24. There is obtained a system of two-phase windings supplied by a common single phase source by connecting conductors 21 and 22, or 23 and 24, respectively to the two wires 25 and 26 supplied by the single phase source 27 and by inserting a phase shifter 28 which may consist of impedances in the conductor 21. The change of the respective phase of the currents in the two windings can furthermore be effected by means of any other known device.

The currents induced in the disc 4 by this system cause rotation of the rotor 3, the plate 5 closing the magnetic circuit of the system. To prevent a substantial variation of the speed of rotation with variations of potential of the source of current or variations in the couple produced by the friction of the pick up, or the like, the lower face of the plate 5 is provided, near its periphery, with teeth 6 which move past the teeth 7 of a second stator 8, comprising a laminated metal core and a winding 9 which is supplied from the same source of current 27 as the windings arranged on the stator 1 by means of the conductors 29 and 30, connected respectively to the wires 25 and 26. An alternator of the so called variable reluctance type is thus obtained, which exerts a torque on the disc 4 which is additional to, or opposed to, that exerted by the system 1, 2 according as the speed of the rotor 3 tends to be higher or lower than the speed of synchronism of the said alternator.

It will thus be seen that by suitably proportioning the various elements, the record disc may be maintained at this synchronous speed, that is to say at a substantially constant speed, the frequency of modern alternating current mains only varying within very small limits. To enable the device to operate in this manner, the speed of synchronism of the alternator must be substantially below the speed at which the torque exerted by the stator 1, 2 on the disc 4 vanishes. The system 1, 2, 4 really forms a low powered induction motor, rotating at very low speed and having a progressive magnetic field and a torque substantially proportional to the slip; its output is thus at a maximum when the slip is 50% and it would be of advantage from this point of view to so proportion the elements of the motor that this would correspond to the normal speed; however, experience shows that if the normal speed is fixed in this manner the torque exerted by the stator 1 when the rotor is stationary may be insufficient for starting, if the winding 9 is also excited. It is therefore necessary to close the circuit of this winding 9 only after rotation has begun if a slip of 50% is employed. This necessity may be inconvenient and in any case leads to certain complications in the switching arrangements. It becomes unnecessary if a normal speed is chosen which corresponds to a smaller slip of the disc 4 relative to the displacement of the magnetic field produced by the assembly 1, 2. It may be shown that under these conditions the torque produced by this assembly when the rotor is stationary is sufficient to overcome the magnetic attraction between the teeth 6 and the teeth 7, when the winding 9 is excited. Moreover, it may be shown that when the speed of synchronism of the alternator formed by the assembly 6, 7, 8, 9 is reached, the maximum retarding torque produced by this assembly remains sufficiently higher than the torque produced by the stator 1 and thus effects an automatic synchronizing when the normal speed is reached. The assembly 6, 7, 8, 9 produces a pulsating magnetic field. The rotor 3 may thus be started by the mere closing of a switch 31 which controls the circuits of the windings 2 and 9, without the operator having to perform any further operation.

The considerations set forth will be understood by examining the diagram of Fig. 2a in which there are shown as abscissas the speeds, and as ordinates the torques, and finally the powers. OA is the normal speed corresponding to synchronism of the synchronous motor. OD is the synchronous speed of the induction motor. The line CD represents the torque of the induction motor and the parabola OED represents the power furnished by the whole assembly. The torque of the synchronous motor is represented by the ordinate AB; it is zero for every speed except synchronism.

The condition for maintaining synchronism of the motor unit by the synchronous motor is that the torque of the synchronous motor should exceed at normal speed the torque of the induction motor. It will be realized that if the normal speed is 50% of the synchronous speed of the induction motor, a value corresponding to the maximum of the power parabola, the torque of the synchronous motor should exceed by 50% the starting torque OC of the induction motor. But as calculations will show, the starting torque and the torque due to the magnetic attraction of the teeth 6 and 7 is double the torque of the synchronous machine at synchronism.

It will therefore appear that the latter torque will exceed by 100% the starting torque OC, which would prevent the starting of the motor. By choosing the normal speed to exceed 50% of the synchronous speed of the induction motor, the synchronous motor can be arranged in such a manner that its torque will be less than 50% of the starting torque but greater than the torque of the induction motor at normal speed.

Taking into consideration the reasons set forth, the slip of 30% in normal operation, represented by AD on Fig. 2a appears to suit in the majority of cases, and again it corresponds to a very satisfying utilization of the assembly 1, 2, 4, whose power AG attains again 84% of the maximum power EH, the torque AB of the synchronous motor exceeding the torque AF of the induction motor but being less than 50% of the starting torque OC.

Figure 3 shows in section (similar to Fig. 1) a modified arrangement in which the planes of the laminae forming the stator 8 are parallel to the plate 5; the teeth 6 are formed in the actual periphery of the said plate which thus takes the form of a spur wheel. The remainder of the apparatus is as shown in Figs. 1 and 2, the same references indicating similar parts. The same applies to the modification shown in Fig. 4 which only differs essentially from the arrangement shown in Figs. 1 and 2, in the shape of the active portion of the rotor, which in this case is formed by a ring 4 surrounding a cylinder 5 of magnetic material, the axis of rotating shaft 13 coinciding with the axis of this cylinder.

In the modification shown in Fig. 5, the metal disc 4 of the preceding figures is replaced by a squirrel-cage winding 10 (or equivalent system). In this case the number of slots holding the said windings may correspond in number to those on the stator 8 and are preferably so arranged that the axis of each of these slots coincides with the axis of one of the teeth 6 (as shown in the figure); maximum utilization is thus made of the iron core of the rotor. With the squirrel-cage arrangement of Fig. 5, the stator 8 may be arranged on the same side of the rotor as the stator 1, each of the stators occupying a portion only of the total periphery as shown in Fig. 6; the stator 8 thus acts on the teeth 11 separating the conductors 10 of the squirrel-cage. To prevent the latter weakening the variations of reluctance thus produced it may be advantageous to allow magnetic leakage to occur, for example, by arranging the conductors 10 at the bottom of sufficiently deep slots. Figs. 5 and 6, the stator 8 which ensures synchronous operation is shown in the form of an E, the central arm of which is provided at its extremity with two teeth 7; the arrangement is particularly advantageous both from the point of view of efficiency and of construction.

It should be noted that all the embodiments above described are given by way of example only and that further variations are possible. In particular, a number of assemblies such as 1, 2 and 7, 8, 9 may act on the same rotor, and the relative size of these assemblies may be varied as required.

The windings 2 and 9, instead of being connected in parallel as in Fig. 2 can be connected in series as shown in Fig. 7. For this purpose the wire 30 instead of being connected to conductor 26 is connected directly to one terminal of the voltage source 27, said terminal being itself insulated from conductor 25 and not being the one which supplies conductor 26; the series method of connection allows wire of a relatively larger gauge to be used, which is clearly of importance in the construction of a low powered device. Moreover, with the series connection it is only necessary to momentarily short circuit the winding 9 by means of interrupter 32 to increase the couple exerted by the stator 1, as a higher potential will then be applied to the winding 2; this may be of use for accelerating the starting in certain special cases.

I claim:

1. In a system for driving phonographs, a stator wound to produce a progressive magnetic field, a separate stator wound to produce a pulsating magnetic field, a common rotor rotating in the fields of said two stators and having salient poles cooperating with said pulsating magnetic field, and means for supplying the stator windings with alternating current.

2. In a system for driving phonographs, a stator wound to produce a progressive magnetic field, a separate stator wound to produce a pulsating magnetic field, a common rotor in the form of a disc rotating in the fields of said two stators and having salient poles cooperating with said pulsating magnetic field, and means for supplying said stators with alternating current.

3. In a system for driving phonographs, a stator wound to produce a progressive magnetic field, a separate stator wound to produce a pulsating magnetic field, a common rotor having salient poles cooperating with said pulsating magnetic field, a part of the periphery of said common rotor being acted upon simultaneously by the field of each stator, and means for supplying the stator windings with alternating current.

4. In a system for driving phonographs, a stator wound to produce a progressive magnetic field, a separate stator wound to produce a pulsating magnetic field, a common rotor rotating in the fields of said two stators and having salient poles cooperating with said pulsating magnetic field, and means for supplying said stators with alternating current, said two stators and said rotor being constructed so that the synchronous speed of said pulsating magnetic field is equal to approximately seventy percent of the synchronous speed of said progressive magnetic field.

5. In a system for driving phonographs, a stator wound to produce a progressive magnetic field, a separate stator wound to produce a pulsating magnetic field, a common rotor rotating in the fields of said two stators and having salient poles cooperating with said pulsating magnetic field, said rotor comprising a layer of material of high electrical conductivity coacting with said progressive magnetic field and another layer of material of high magnetic permeability coacting with said pulsating magnetic field, said layer of material of high magnetic permeability being provided with peripheral slots, conductors of high electrical conductivity carried in said slots, and means for exciting said stators with alternating current for establishing said progressive magnetic field for driving said rotor.

6. In a motor unit, a stator wound to produce a progressive magnetic field, a separate stator wound to produce a pulsating magnetic field, a common rotor rotating in the fields of said two stators and provided on one face thereof substantially perpendicular to its axis of rotation with peripheral teeth and intermediate slots carrying conductors of high electrical conductivity, both of said stators being positioned on the slotted side of said rotor for presentation in magnetic relation thereto and for cooperation between said pulsating magnetic field and the teeth and slots of said rotor.

7. In a combined motor unit comprising a stator wound to produce a progressive magnetic field and a stator wound to produce a pulsating magnetic field, a composite rotor common to said stators comprising a layer of material of high electrical conductivity and a layer of material of high magnetic permeability superposed on said first mentioned layer, said layer of material of high magnetic permeability being provided with salient poles cooperating with said pulsating field.

8. In a combined motor unit comprising a stator wound to produce a progressive magnetic field and a stator wound to produce a pulsating magnetic field, a composite rotor common to said stators comprising a layer of material of high electrical conductivity and a layer of material of high magnetic permeability, said layer of material of high magnetic permeability being provided with teeth positioned for cooperation with said pulsating field, and said layer of material of high electrical conductivity being provided with slots positioned for presentation to said stator wound to produce a progressive magnetic field, said slots in said material of high electrical conductivity being provided with a winding cooperating with said progressive magnetic field.

JOSEPH BETHENOD.